United States Patent
Wang et al.

(10) Patent No.: US 9,601,978 B2
(45) Date of Patent: Mar. 21, 2017

(54) ALUMINUM ALLOY ROTOR FOR AN ELECTROMAGNETIC DEVICE

(71) Applicant: GM GLOBAL TECHNOLOGY OPERATIONS LLC, Detroit, MI (US)

(72) Inventors: Qigui Wang, Rochester Hills, MI (US); Richard Jack Osborne, Shelby Township, MI (US); Yucong Wang, West Bloomfield, MI (US); Margarita Thompson, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 889 days.

(21) Appl. No.: 13/871,109

(22) Filed: Apr. 26, 2013

(65) Prior Publication Data

US 2014/0319956 A1    Oct. 30, 2014

(51) Int. Cl.
- *H02K 17/16* (2006.01)
- *B22D 19/00* (2006.01)
- *B22D 21/00* (2006.01)
- *C22C 21/00* (2006.01)

(52) U.S. Cl.
CPC ....... *H02K 17/165* (2013.01); *B22D 19/0054* (2013.01); *B22D 21/007* (2013.01); *C22C 21/00* (2013.01)

(58) Field of Classification Search
CPC ... H02K 17/165; C22C 21/00; B22D 19/0054
See application file for complete search history.

(56) References Cited

U.S. PATENT DOCUMENTS

| | | |
|---|---|---|
| 2007/0240796 A1 | 10/2007 | Koch et al. |
| 2011/0240178 A1 | 10/2011 | Shibata et al. |
| 2012/0211130 A1* | 8/2012 | Lin ............... B22D 21/007 148/549 |

FOREIGN PATENT DOCUMENTS

| | | |
|---|---|---|
| CN | 1733954 A | 2/2006 |
| CN | 101626179 A | 1/2010 |
| CN | 101787470 A | 7/2010 |
| CN | 101831578 A | 9/2010 |
| CN | 102011036 A | 4/2011 |
| CN | 102268574 A | 12/2011 |
| CN | 102634701 A | 8/2012 |
| CN | 102903415 A | 1/2013 |

OTHER PUBLICATIONS

ALCAN, Shape Casting Alloys Data Sheet, Sep. 15, 2010.

* cited by examiner

*Primary Examiner* — Roy King
*Assistant Examiner* — Janelle Morillo
(74) *Attorney, Agent, or Firm* — Quinn Law Group, PLLC

(57) ABSTRACT

A rotor includes a shorting ring defining a plurality of cavities therein, and a plurality of conductor bars each integral with the shorting ring and having an end disposed within a respective one of the plurality of cavities. The shorting ring and each of the conductor bars are formed from an aluminum alloy including a lanthanoid present in an amount of from about 0.1 part by weight to about 0.5 parts by weight based on 100 parts by weight of the aluminum alloy. An aluminum alloy, and a method of forming a rotor are also disclosed.

16 Claims, 8 Drawing Sheets

ALUMINUM ALLOY ROTOR FOR AN ELECTROMAGNETIC DEVICE

TECHNICAL FIELD

The present disclosure relates to rotors for an electromagnetic device.

BACKGROUND

Electromagnetic devices such as electric motors, generators, and traction motors are useful for converting energy from one form to another. Such electromagnetic devices often include an element rotatable about an axis of rotation. The rotatable element, i.e., a rotor, may be coaxial with a static element, i.e., a stator, and energy may be converted via relative rotation between the rotor and stator.

SUMMARY

A rotor for an electromagnetic device includes a shorting ring defining a plurality of cavities therein. The rotor also includes a plurality of conductor bars each integral with the shorting ring and having an end disposed within a respective one of the plurality of cavities. The shorting ring and each of the plurality of conductor bars are formed from an aluminum alloy. The aluminum alloy includes silicon present in an amount of less than or equal to about 0.15 parts by weight, iron present in an amount of less than or equal to about 0.8 parts by weight, copper present in an amount of less than or equal to about 0.1 part by weight, and zinc present in an amount of less than or equal to about 0.05 parts by weight, each based on 100 parts by weight of the aluminum alloy. The aluminum alloy also includes an additive including at least one element selected from the group consisting of manganese, magnesium, chromium, titanium, and vanadium, wherein the additive is present in an amount of less than or equal to about 0.04 parts by weight based on 100 parts by weight of the aluminum alloy. The aluminum alloy also includes a lanthanoid present in an amount of from about 0.1 part by weight to about 0.5 parts by weight based on 100 parts by weight of the aluminum alloy, and the balance aluminum.

A method of forming a rotor includes melting a first aluminum alloy at a temperature of from about 700° C. to about 750° C. to form a liquid melt. The first aluminum alloy includes silicon present in an amount of less than or equal to about 0.15 parts by weight, iron present in an amount of less than or equal to about 0.8 parts by weight, copper present in an amount of less than or equal to about 0.1 part by weight, and zinc present in an amount of less than or equal to about 0.05 parts by weight, each based on 100 parts by weight of the first aluminum alloy. The first aluminum alloy also includes an additive including at least one element selected from the group consisting of manganese, magnesium, chromium, titanium, and vanadium, wherein the additive is present in an amount of less than or equal to about 0.025 parts by weight based on 100 parts by weight of the first aluminum alloy, and the balance aluminum. The method also includes combining a master aluminum alloy and the liquid melt to form an aluminum alloy, wherein the master aluminum alloy includes a lanthanoid present in an amount of about 10 parts by weight based on 100 parts by weight of the master aluminum alloy. The aluminum alloy includes silicon present in an amount of less than or equal to about 0.15 parts by weight, iron present in an amount of less than or equal to about 0.8 parts by weight, copper present in an amount of less than or equal to about 0.1 part by weight, and zinc present in an amount of less than or equal to about 0.05 parts by weight, each based on 100 parts by weight of the aluminum alloy. The aluminum alloy also includes an additive including at least one element selected from the group consisting of manganese, magnesium, chromium, titanium, and vanadium, wherein the additive is present in an amount of less than or equal to about 0.04 parts by weight based on 100 parts by weight of the aluminum alloy. The aluminum alloy further includes a lanthanoid present in an amount of from about 0.1 part by weight to about 0.5 parts by weight based on 100 parts by weight of the aluminum alloy, and the balance aluminum. The method further includes filling a conductor bar cavity defined by a casting mold with the aluminum alloy. In addition, the method includes filling a shorting ring cavity fluidly connected to the conductor bar cavity and defined by the casting mold with the aluminum alloy. The method also includes cooling the aluminum alloy disposed within the conductor bar cavity to form an end of a conductor bar. Concurrent to cooling the aluminum alloy disposed within the conductor bar cavity, the method also includes cooling the aluminum alloy disposed within the shorting ring cavity to form a shorting ring integral with the end of the conductor bar and thereby form the rotor.

An aluminum alloy includes silicon present in an amount of less than or equal to about 0.15 parts by weight, iron present in an amount of less than or equal to about 0.8 parts by weight, copper present in an amount of less than or equal to about 0.1 part by weight, and zinc present in an amount of less than or equal to about 0.05 parts by weight, each based on 100 parts by weight of the aluminum alloy. The aluminum alloy also includes an additive including at least one element selected from the group consisting of manganese, magnesium, chromium, titanium, and vanadium, wherein the additive is present in an amount of less than or equal to about 0.04 parts by weight based on 100 parts by weight of the aluminum alloy. In addition, the aluminum alloy includes a lanthanoid present in an amount of from about 0.1 part by weight to about 0.5 parts by weight based on 100 parts by weight of the aluminum alloy, and the balance aluminum.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
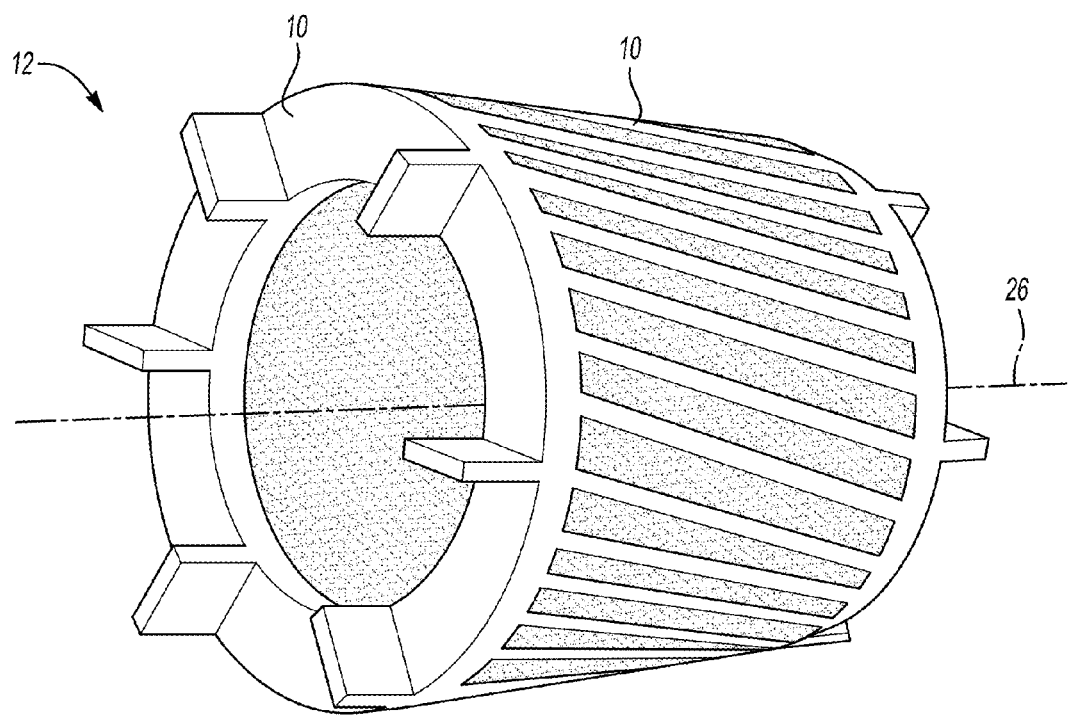
FIG. 1 is a schematic perspective illustration of an electromagnetic device including a rotor.
Figure 2:
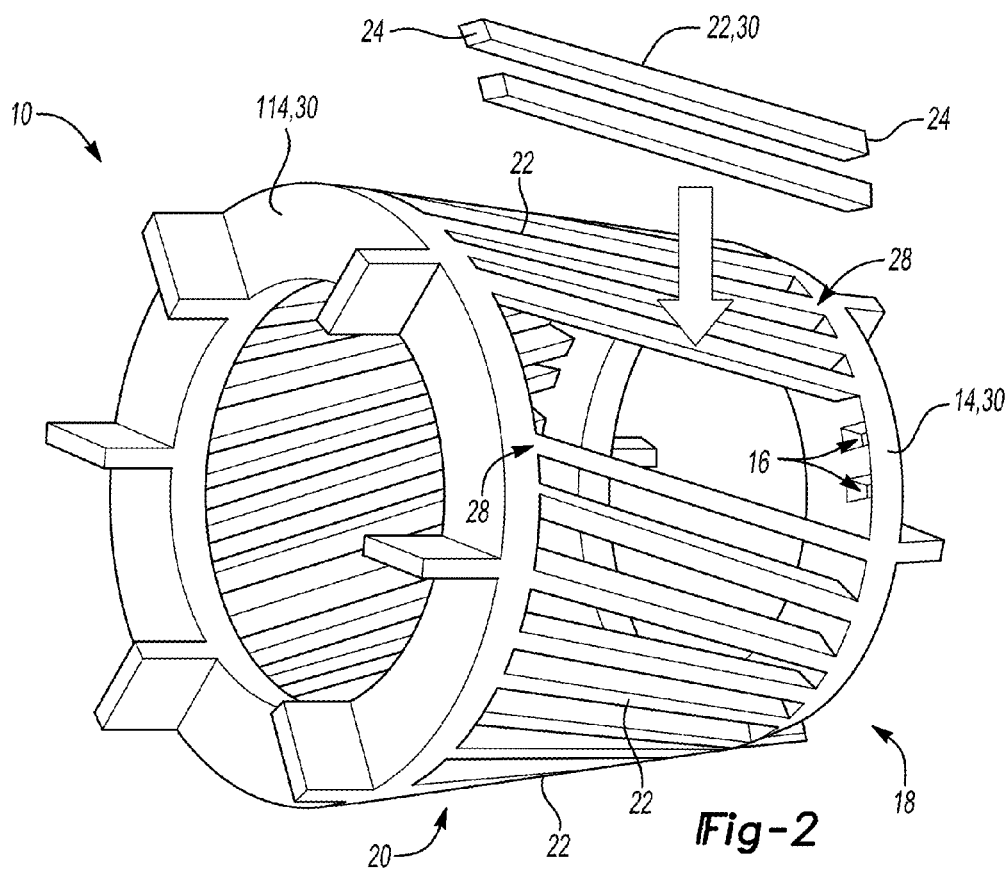
FIG. 2 is a schematic perspective partially exploded illustration of the rotor of FIG. 1, wherein the rotor includes a shorting ring and a conductor bar having an end integral with the shorting ring.
Figure 15:
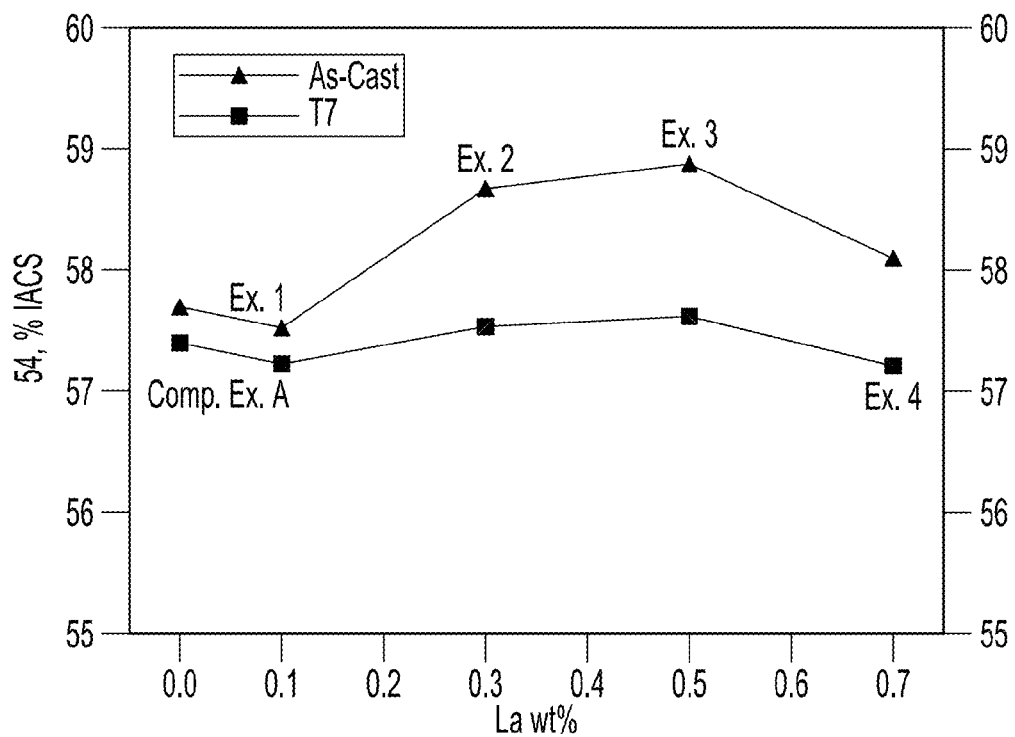
FIG. 15 is a graphical representation of a relationship between an amount of lanthanum present in the aluminum alloys of Comparative Examples A and Examples 1-4, and an electrical conductivity of a casting formed therefrom.

Referring to the Figures, wherein like reference numerals refer to like elements, a rotor 10 for an electromagnetic device 12 (FIG. 1) is shown generally in FIG. 2. The rotor 10 may be useful for electromagnetic devices 12 such as alternating current induction motors, and as such, may be useful for automotive applications requiring rotors having excellent castability, mechanical properties, and electrical conductivity 54 (FIG. 15). However, the rotor 10 may also be useful for non-automotive applications such as, for example, electromagnetic devices 12 for appliances and industrial machinery.

Referring now to FIG. 2, the rotor 10 includes a shorting ring 14 defining a plurality of cavities 16 therein. More specifically, the rotor 10 may include a plurality of shorting rings 14, 114, e.g., two shorting rings 14, 114, each disposed at a respective bottom end 18 and top end 20 of the rotor 10. Further, the rotor 10 includes a plurality of conductor bars 22 each integral with the shorting ring 14, 114 and having an end 24 disposed within a respective one of the plurality of cavities 16. That is, the end 24 of each of the plurality of conductor bars 22 may be integrally formed with and attached to the shorting ring 14, 114, as set forth in more detail below. As such, the rotor 10 may be characterized as a squirrel cage rotor.

One type of electromagnetic device 12 (FIG. 1), the alternating current induction motor, uses induced current flow to magnetize portions of the rotor 10 during motor operation. More specifically, induced current may flow through the plurality of conductor bars 22 (FIG. 2) disposed parallel to an axis of rotation 26 (FIG. 1) of the electromagnetic device 12 along a periphery of the rotor 10. Further, each of the plurality of conductor bars 22 may be electrically connected to every other conductor bar 22 by the one or more shorting rings 14, 114 (FIG. 2) disposed at the top and bottom ends 20, 18 (FIG. 2) of the rotor 10. The shorting ring 14, 114 may generally have a complex, intricate shape, and a joint (shown generally at 28 in FIG. 2) between the shorting ring 14, 114 and each of the plurality of conductor bars 22 may be subject to inertial forces during rotor operation.

Referring again to FIG. 2, the shorting ring 14, 114 and each of the plurality of conductor bars 22 are formed from an aluminum alloy (denoted generally by 30). The aluminum alloy 30 includes silicon, iron, copper, zinc, an additive, a lanthanoid, and the balance aluminum, as set forth in more detail below.

More specifically, the aluminum alloy 30 includes silicon present in an amount of less than or equal to about 0.15 parts by weight based on 100 parts by weight of the aluminum alloy 30. As used herein, the terminology "about" is a quantity modifier and refers to plus or minus 0.01 percent of a stated quantity. Silicon may be present in the aluminum alloy 30 to provide excellent castability of the aluminum alloy 30, and excellent electrical conductivity 54 (FIG. 15) of the shorting ring 14, 114 and plurality of conductor bars 22 formed from the aluminum alloy 30. In one non-limiting example, the aluminum alloy 30 may include silicon present in an amount of from about 0.073 parts by weight to about 0.107 parts by weight based on 100 parts by weight of the aluminum alloy 30. For example, the aluminum alloy 30 may include silicon present in an amount of from about 0.075 parts by weight to about 0.107 parts by weight based on 100 parts by weight of the aluminum alloy 30. More specifically, by way of a non-limiting example, the aluminum alloy 30 may include silicon present in an amount of from about 0.073 parts by weight to about 0.078 parts by weight based on 100 parts by weight of the aluminum alloy 30. Silicon present in the aluminum alloy 30 in an amount of greater than about 0.15 parts by weight based on 100 parts by weight of the aluminum alloy 30 may degrade the castability of the aluminum alloy 30 and/or decrease the electrical conductivity 54 (FIG. 15) of the shorting ring 14, 114 (FIG. 2) and/or plurality of conductor bars 22 (FIG. 2) formed therefrom.

In addition, the aluminum alloy 30 includes iron present in an amount of less than or equal to about 0.8 parts by weight based on 100 parts by weight of the aluminum alloy 30. Iron may also be present in the aluminum alloy 30 to provide excellent castability of the aluminum alloy 30, and excellent electrical conductivity 54 (FIG. 15) of the shorting ring 14, 114 (FIG. 2) and plurality of conductor bars 22 (FIG. 2) formed from the aluminum alloy 30. Iron may also be present in the aluminum alloy 30 to minimize or prevent die soldering during casting of the aluminum alloy 30. In one non-limiting example, the aluminum alloy 30 may include iron present in an amount of from about 0.109 parts by weight to about 0.129 parts by weight based on 100 parts by weight of the aluminum alloy 30. For example, the aluminum alloy 30 may include iron present in an amount of from about 0.110 parts by weight to about 0.129 parts by weight based on 100 parts by weight of the aluminum alloy 30. More specifically, by way of a non-limiting example, the aluminum alloy 30 may include iron present in an amount of from about 0.110 parts by weight to about 0.115 parts by weight based on 100 parts by weight of the aluminum alloy 30. Iron present in the aluminum alloy 30 in an amount of greater than about 0.8 parts by weight based on 100 parts by weight of the aluminum alloy 30 may degrade the castability of the aluminum alloy 30 and/or decrease the electrical conductivity 54 (FIG. 15) of the shorting ring 14, 114 (FIG. 2) and/or plurality of conductor bars 22 (FIG. 2) formed therefrom.

Further, the aluminum alloy 30 includes copper present in an amount of less than or equal to about 0.1 part by weight based on 100 parts by weight of the aluminum alloy 30. That is, copper may be present in the aluminum alloy 30 in a relatively small amount and may have only a minimal effect on the castability of the aluminum alloy 30 and electrical conductivity 54 of the shorting ring 14, 114 (FIG. 2) and plurality of conductor bars 22 (FIG. 2) formed from the aluminum alloy 30. Copper present in the aluminum alloy 30 in an amount of greater than about 0.1 part by weight based on 100 parts by weight of the aluminum alloy 30 may degrade the castability of the aluminum alloy 30 and/or decrease the electrical conductivity 54 (FIG. 15) of the shorting ring 14, 114 (FIG. 2) and/or plurality of conductor bars 22 (FIG. 2) formed therefrom.

Likewise, the aluminum alloy 30 includes zinc present in an amount of less than or equal to about 0.05 parts by weight based on 100 parts by weight of the aluminum alloy 30. That is, zinc may be also present in the aluminum alloy 30 in a relatively small amount and may have only a minimal effect on the castability of the aluminum alloy 30 and electrical conductivity 54 (FIG. 15) of the shorting ring 14, 114 (FIG. 2) and plurality of conductor bars 22 (FIG. 2) formed from the aluminum alloy 30. Zinc present in the aluminum alloy 30 in an amount of greater than about 0.05 parts by weight based on 100 parts by weight of the aluminum alloy 30 may degrade the castability of the aluminum alloy 30 and/or decrease the electrical conductivity 54 of the shorting ring 14, 114 (FIG. 2) and/or plurality of conductor bars 22 (FIG. 2) formed therefrom.

The aluminum alloy 30 further includes the additive, which may be characterized as a combination of elements. More specifically, the additive includes at least one element selected from the group consisting of manganese, magnesium, chromium, titanium, and vanadium. For example, the additive may include a combination of two or more of manganese, magnesium, chromium, titanium, and vanadium. The additive is present in an amount of less than or equal to about 0.04 parts by weight based on 100 parts by weight of the aluminum alloy 30. Stated differently, at least one of the elements of manganese, magnesium, chromium, titanium, and vanadium, i.e., the additive, is present in sum in an amount of less than or equal to about 0.04 parts by weight based on 100 parts by weight of the aluminum alloy 30. In one non-limiting example, the additive may be present in an amount of less than or equal to about 0.025 parts by weight based on 100 parts by weight of the aluminum alloy 30.

In particular, by way of non-limiting examples, the aluminum alloy 30 may include magnesium present in an amount of less than or equal to about 0.0009 parts by weight based on 100 parts by weight of the aluminum alloy 30. For example, magnesium may be present in an amount of from about 0.0003 parts by weight to about 0.0009 parts by weight based on 100 parts by weight of the aluminum alloy 30. However, in another non-limiting example, magnesium may be present in the aluminum alloy 30 in an amount of less than or equal to about 0.0001 part by weight based on 100 parts by weight of the aluminum alloy 30. That is, magnesium may be also present in the aluminum alloy 30 in a relatively small amount and may have only a minimal effect on the castability of the aluminum alloy 30 and electrical conductivity 54 (FIG. 15) of the shorting ring 14, 114 (FIG. 2) and plurality of conductor bars 22 (FIG. 2) formed from the aluminum alloy 30. Although optional, when included in the aluminum alloy 30, magnesium present in the aluminum alloy 30 in an amount of greater than about 0.0009 parts by weight based on 100 parts by weight of the aluminum alloy 30 may degrade the castability of the aluminum alloy 30 and/or decrease the electrical conductivity 54 of the shorting ring 14, 114 (FIG. 2) and/or plurality of conductor bars 22 (FIG. 2) formed therefrom.

Further, by way of non-limiting examples, the aluminum alloy 30 may include titanium present in an amount of from about 0.012 parts by weight to about 0.03 parts by weight based on 100 parts by weight of the aluminum alloy 30. For example, titanium may be present in an amount of from about 0.013 parts by weight to about 0.03 parts by weight based on 100 parts by weight of the aluminum alloy 30. However, in another non-limiting example, titanium may be present in the aluminum alloy 30 in an amount of from about 0.01 part by weight to about 0.013 parts by weight based on 100 parts by weight of the aluminum alloy 30. That is, titanium may be present in the aluminum alloy 30 in a relatively large amount and may have a comparatively significant effect on the electrical conductivity 54 (FIG. 15) of the shorting ring 14, 114 (FIG. 2) and plurality of conductor bars 22 (FIG. 2) formed from the aluminum alloy 30. In particular, titanium may improve the electrical conductivity 54 of the shorting ring 14, 114 and plurality of conductor bars 22. Although optional, when included in the aluminum alloy 30, titanium present in the aluminum alloy 30 in an amount of less than about 0.012 parts by weight or greater than about 0.03 parts by weight based on 100 parts by weight of the aluminum alloy 30 may decrease the electrical conductivity 54 of the shorting ring 14, 114 (FIG. 2) and/or plurality of conductor bars 22 (FIG. 2) formed therefrom.

Likewise, by way of non-limiting examples, the aluminum alloy 30 may include vanadium present in an amount of from about 0.0029 parts by weight to about 0.005 parts by weight based on 100 parts by weight of the aluminum alloy 30. For example, vanadium may be present in an amount of from about 0.005 parts by weight to about 0.015 parts by weight based on 100 parts by weight of the aluminum alloy 30. However, in another non-limiting example, vanadium may be present in the aluminum alloy 30 in an amount of from about 0.014 parts by weight to about 0.015 parts by weight based on 100 parts by weight of the aluminum alloy 30. Vanadium may be present in the aluminum alloy 30 in a relatively large amount and may have a comparatively significant effect on the electrical conductivity 54 (FIG. 15)

of the shorting ring 14, 114 (FIG. 2) and plurality of conductor bars 22 (FIG. 2) formed from the aluminum alloy 30. In particular, vanadium may improve the electrical conductivity 54 of the shorting ring 14, 114 and plurality of conductor bars 22. Although optional, when included in the aluminum alloy 30, vanadium present in the aluminum alloy 30 in an amount of less than about 0.0029 parts by weight or greater than about 0.005 parts by weight based on 100 parts by weight of the aluminum alloy 30 may decrease the electrical conductivity 54 of the shorting ring 14, 114 (FIG. 2) and/or plurality of conductor bars 22 (FIG. 2) formed therefrom.

Furthermore, the aluminum alloy 30 includes the lanthanoid, i.e., a rare earth element of the lanthanide series of the periodic table of the elements having an atomic number of from 57 through 71, present in an amount of from about 0.1 part by weight to about 0.5 parts by weight based on 100 parts by weight of the aluminum alloy 30. More specifically, in one non-limiting example, the lanthanoid may be lanthanum and may be present in an amount of from about 0.1 part by weight to about 0.3 parts by weight based on 100 parts by weight of the aluminum alloy 30. For example, the aluminum alloy 30 may include lanthanum in an amount of about 0.3 parts by weight based on 100 parts by weight of the aluminum alloy 30. When present in the aluminum alloy 30 in the aforementioned ranges, lanthanum may provide the aluminum alloy 30 with excellent castability, fluidity 50 (FIG. 5), and hot-tearing resistance, as set forth in the Examples below. Further, when present in the aluminum alloy 30 in the aforementioned ranges, lanthanum may provide the shorting rings 14, 114 (FIG. 2) and plurality of conductor bars 22 (FIG. 2) formed from the aluminum alloy 30 with excellent mechanical properties and electrical conductivity 54 (FIG. 15). In particular, the joint 28 (FIG. 2) between the end 24 (FIG. 2) of the conductor bar 22 and the shorting ring 14, 114 may be substantially free from hot tearing and/or failures from cracking or tensile stress when formed from the aluminum alloy 30 including lanthanum. As such, inclusion of lanthanum in the aluminum alloy 30 provides for lightweight cast aluminum rotors 10 (FIG. 2) having excellent mechanical integrity, and provides for electromagnetic devices 12 (FIG. 1) having excellent performance and power density. However, for embodiments including lanthanum, lanthanum present in an amount of less than about 0.1 part by weight and/or greater than about 0.3 parts by weight may degrade the castability of the aluminum alloy 30 and/or the electrical conductivity 54 of the shorting rings 14, 114 and/or plurality of conductor bars 22 formed therefrom.

Figure 23:
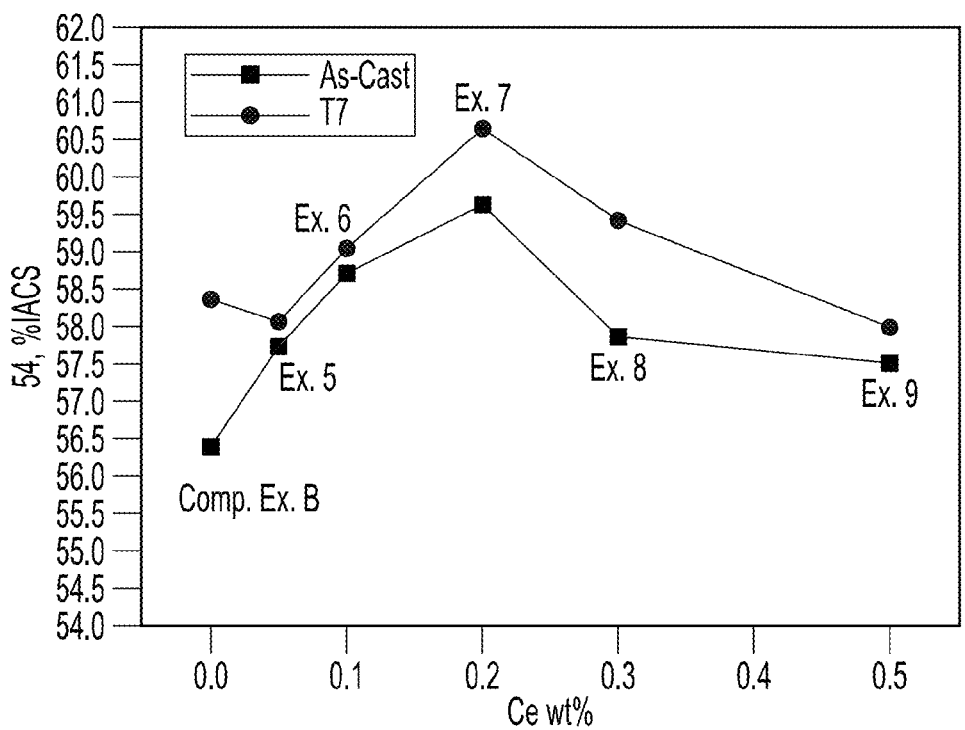
FIG. 23 is a graphical representation of a relationship between an amount of cerium present in the aluminum alloys of Comparative Examples A and Examples 1-4, and an electrical conductivity of a casting formed therefrom.
Figure 17:
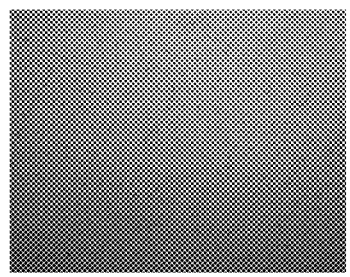
FIG. 17 is a metallographic micrograph of a constituent structure of the aluminum alloy of Comparative Example B.
Figure 18:
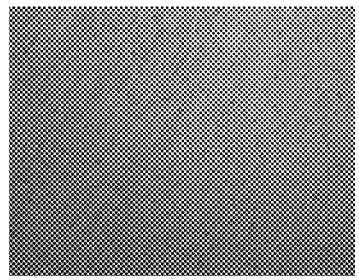
FIG. 18 is a metallographic micrograph of a constituent structure of the aluminum alloy of Example 5.
Figure 19:
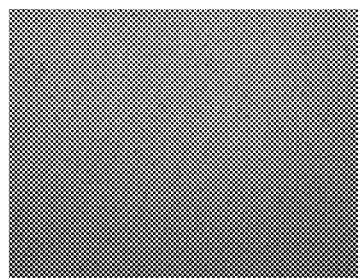
FIG. 19 is a metallographic micrograph of a constituent structure of the aluminum alloy of Example 6.

In another non-limiting example, the lanthanoid may be cerium and may be present in an amount of from about 0.2 parts by weight to about 0.3 parts by weight based on 100 parts by weight of the aluminum alloy 30. For example, the aluminum alloy 30 may include cerium in an amount of about 0.3 parts by weight based on 100 parts by weight of the aluminum alloy 30. When present in the aluminum alloy 30 in the aforementioned ranges, cerium may also provide the aluminum alloy 30 with excellent castability, fluidity 50 (FIG. 16), and hot-tearing resistance, as set forth in the Examples below. Further, when present in the aluminum alloy 30 in the aforementioned ranges, cerium may provide the shorting rings 14, 114 (FIG. 2) and plurality of conductor bars 22 (FIG. 2) formed from the aluminum alloy 30 with excellent mechanical properties and electrical conductivity 54 (FIG. 23). In particular, the joint 28 (FIG. 2) between the end 24 (FIG. 2) of the conductor bar 22 and the shorting ring 14, 114 may be substantially free from hot tearing and/or failures from cracking or tensile stress when formed from the aluminum alloy 30 including cerium. As such, inclusion of cerium in the aluminum alloy 30 provides for lightweight cast aluminum rotors 10 (FIG. 2) having excellent mechanical integrity, and provides for electromagnetic devices 12 (FIG. 1) having excellent performance and power density. However, for embodiments including cerium, cerium present in an amount of less than about 0.2 parts by weight and/or greater than about 0.3 parts by weight may degrade the castability of the aluminum alloy 30 and/or the electrical conductivity 54 of the shorting rings 14, 114 and/or plurality of conductor bars 22 formed therefrom.

In addition, the aluminum alloy 30 is substantially free from magnesium silicide, $Mg_2Si$. That is, magnesium silicide may not be present in the aluminum alloy 30.

Figure 3:
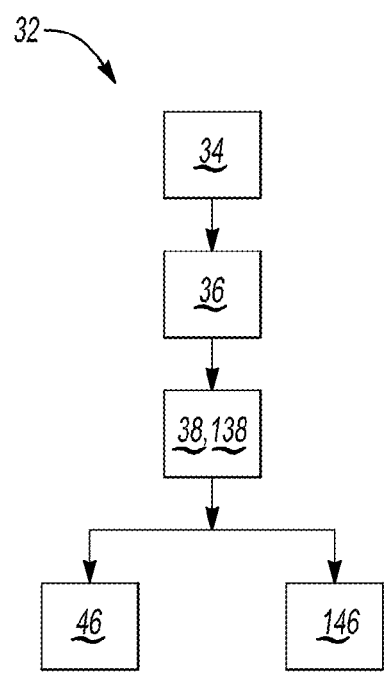
FIG. 3 is a schematic flowchart of a method of forming the rotor of FIG. 2.

Referring now to FIG. 3, a method 32 of forming the rotor 10 (FIG. 2), e.g., by integrally forming the end 24 (FIG. 2) of the conductor bar 22 (FIG. 2) and the shorting ring 14, 114 (FIG. 2), includes melting 34 a first aluminum alloy at a temperature of from about 700° C. to about 750° C. to form a liquid melt. For example, the first aluminum alloy may be a commercially pure aluminum alloy and may be melted in an oven or other suitable heating apparatus to form the liquid melt. In particular, the first aluminum alloy includes silicon present in an amount of less than or equal to about 0.15 parts by weight based on 100 parts by weight of the first aluminum alloy, iron present in an amount of less than or equal to about 0.8 parts by weight based on 100 parts by weight of the first aluminum alloy, copper present in an amount of less than or equal to about 0.1 part by weight based on 100 parts by weight of the first aluminum alloy, zinc present in an amount of less than or equal to about 0.05 parts by weight based on 100 parts by weight of the first aluminum alloy, the additive including at least one element selected from the group consisting of manganese, magnesium, chromium, titanium, and vanadium, wherein the additive is present in an amount of less than or equal to about 0.025 parts by weight based on 100 parts by weight of the first aluminum alloy, and the balance aluminum.

Referring again to FIG. 3, the method 32 also includes combining 36 a master aluminum alloy and the liquid melt to form the aluminum alloy 30 (FIG. 2). The master aluminum alloy includes the lanthanoid present in an amount of about 10 parts by weight based on 100 parts by weight of the master aluminum alloy. For example, the method 32 may include melting the master aluminum alloy at a temperature of from about 700° C. to about 750° C. to form a master liquid melt, and combining 36 the master liquid melt with the liquid melt to form the aluminum alloy 30.

Figure 4:
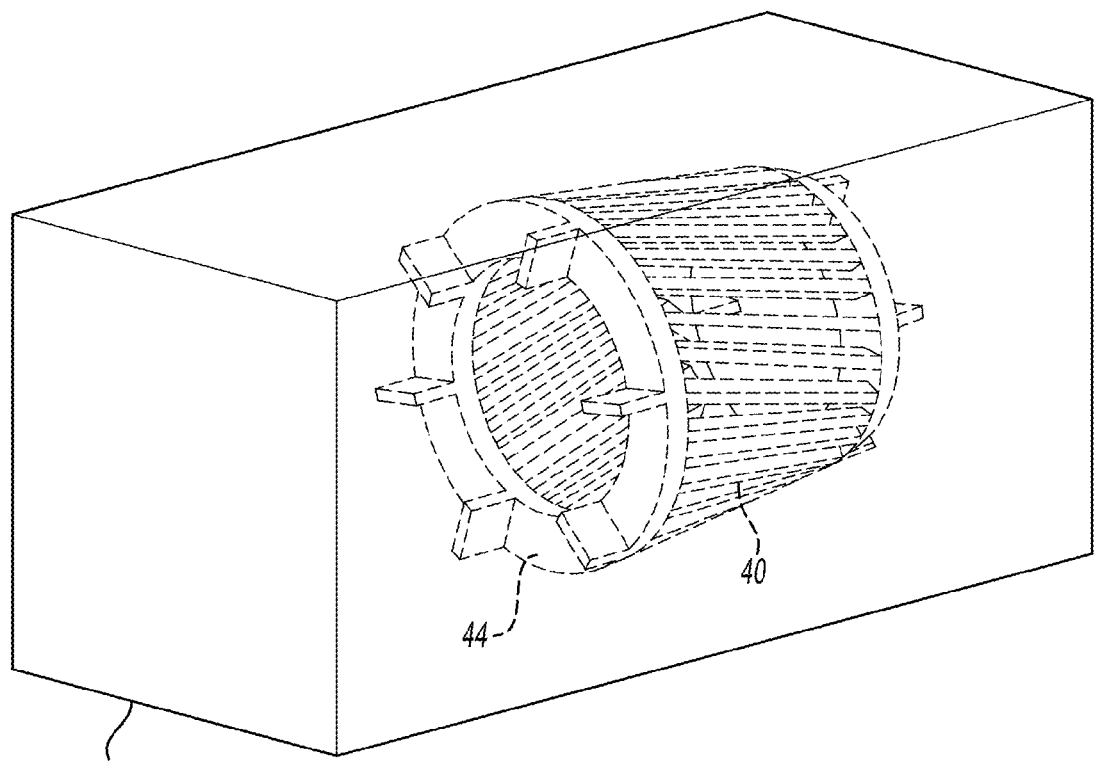
FIG. 4 is a schematic perspective illustration of a casting mold for use with the method of FIG. 3.

Referring now to FIG. 4, the method 32 (FIG. 3) further includes filling 38 (FIG. 3) a conductor bar cavity 40 defined by a casting mold 42 with the aluminum alloy 30 (FIG. 2). The method 32 also includes filling 138 (FIG. 3) a shorting ring cavity 44 fluidly connected to the conductor bar cavity 40 and defined by the casting mold 42 with the aluminum alloy 30. By way of a non-limiting example, filling 38, 138 may include pouring the aluminum alloy 30 into the conductor bar cavity 40 and the shorting ring cavity 44. Alternatively, in another non-limiting example, filling 38, 138 may include submerging the casting mold 42 in the aluminum alloy 30 so as to dispose the aluminum alloy 30 in each of the conductor bar cavity 40 and the shorting ring cavity 44.

In addition, although not shown in FIG. 3, prior to filling 38, 138, the method 32 may optionally include fluxing the aluminum alloy 30 (FIG. 2) with any suitable chemical flux to thereby remove oxides from the aluminum alloy 30. Alternatively or additionally, the method 32 may optionally include degassing the aluminum alloy 30 with one or more inert gases such as argon or nitrogen to improve a purity of the liquid melt and/or aluminum alloy 30.

Referring again to FIG. 3, the method 32 also includes cooling 46 the aluminum alloy 30 (FIG. 2) disposed within the conductor bar cavity 40 (FIG. 4) to form the end 24 (FIG. 2) of the conductor bar 22 (FIG. 2). Likewise, concurrent with cooling 46 the aluminum alloy 30 disposed within the conductor bar cavity 40, the method 32 includes cooling 146 the aluminum alloy 30 disposed within the shorting ring cavity 44 (FIG. 4) to form the shorting ring 14 (FIG. 2) integral with the end 24 of the conductor bar 22, and thereby form the rotor 10 (FIG. 2). That is, cooling 46, 146 may be further defined as casting the conductor bar 22 and the shorting ring 14, each formed from the same aluminum alloy 30, to thereby integrally form the end 24 and the shorting ring 14. By way of non-limiting examples, cooling 46, 146 may include permanent mold casting with or without vibration, centrifugal casting, high pressure die casting, and squeeze casting. Therefore, cooling 46, 146 may include chilling the aluminum alloy 30 disposed within the conductor bar cavity 40 and the shorting ring cavity 44 to attach the end 24 of the conductor bar 22 to the shorting ring 14 and thereby form the rotor 10.

The following examples are meant to illustrate the disclosure and are not to be viewed in any way as limiting to the scope of the disclosure.

EXAMPLES

To prepare the aluminum alloys of Examples 1-4, a first aluminum alloy having the composition listed in Table 1 is melted at a temperature of 725° C. to form a liquid melt. The weight percentages listed in Table 1 are based on 100 parts by weight of the first aluminum alloy.

TABLE 1

First Aluminum Alloy Compositions

| Element | Amount (wt %) |
|---|---|
| Si | up to 0.15 |
| Fe | up to 0.025 |
| Cu | up to 0.1 |
| Zn | up to 0.05 |
| Sum of Mg, Ti, and V | up to 0.025 |
| Al | balance |

Further, a master aluminum alloy including lanthanum present in an amount of about 10 parts by weight based on 100 parts by weight of the master aluminum alloy is melted at a temperature of 725° C. to form a master liquid melt. The master liquid melt is combined with the liquid melt at various concentrations to form the aluminum alloys of Examples 1-4 having the compositions listed in Table 2.1. The liquid melt is not combined with the master liquid melt to form the aluminum alloy of Comparative Example A. Rather, the aluminum alloy of Comparative Example A is free from the master liquid melt. The weight percentages listed in Table 2.1 are based on 100 parts by weight of the aluminum alloy.

Moreover, a master aluminum alloy including cerium present in an amount of about 10 parts by weight based on 100 parts by weight of the master aluminum alloy is melted at a temperature of 725° C. to form a second master liquid melt. The second master liquid melt is combined with the liquid melt at various concentrations to form the aluminum alloys of Examples 5-9 having the compositions listed in Table 2.2. The liquid melt is not combined with the second master liquid melt to form the aluminum alloy of Comparative Example B. Rather, the aluminum alloy of Comparative Example B is free from the second master melt. The weight percentages listed in Table 2.2 are based on 100 parts by weight of the aluminum alloy.

TABLE 2.1

Aluminum Alloy Compositions

| Sample | Si (wt %) | Mg (wt %) | $Mg_2Si$ (wt %) | La (wt %) | Fe (wt %) | Ti (wt %) | V (wt %) | Al (wt %) |
|---|---|---|---|---|---|---|---|---|
| Comp. Ex. A | 0.073 | 0.0017 | 0 | 0 | 0.180 | 0.0014 | 0.0064 | balance |
| Ex. 1 | 0.075 | 0.0003 | 0 | 0.1 | 0.109 | 0.012 | 0.0029 | balance |
| Ex. 2 | 0.107 | 0.0009 | 0 | 0.3 | 0.129 | 0.03 | 0.005 | balance |
| Ex. 3 | 0.072 | 0.0025 | 0 | 0.55 | 0.170 | 0.0017 | 0.0085 | balance |
| Ex. 4 | 0.074 | 0.0012 | 0 | 0.67 | 0.181 | 0.0020 | 0.0091 | balance |

TABLE 2.2

Aluminum Alloy Compositions

| Sample | Si (wt %) | Mg (wt %) | $Mg_2Si$ (wt %) | Ce (wt %) | Fe (wt %) | Ti (wt %) | V (wt %) | Al (wt %) |
|---|---|---|---|---|---|---|---|---|
| Comp. Ex. B | 0.0668 | <0.0003 | 0 | 0 | 0.107 | 0.0076 | 0.0097 | balance |
| Ex. 5 | 0.0662 | <0.0003 | 0 | 0.05 | 0.107 | 0.0072 | 0.0095 | balance |
| Ex. 6 | 0.0683 | <0.0001 | 0 | 0.1 | 0.097 | 0.0088 | 0.0105 | balance |
| Ex. 7 | 0.0780 | <0.0001 | 0 | 0.2 | 0.115 | 0.01 | 0.0140 | balance |
| Ex. 8 | 0.0730 | <0.0001 | 0 | 0.3 | 0.110 | 0.013 | 0.0150 | balance |
| Ex. 9 | 0.0625 | <0.0003 | 0 | 0.5 | 0.100 | 0.014 | 0.0105 | balance |

Figure 5:
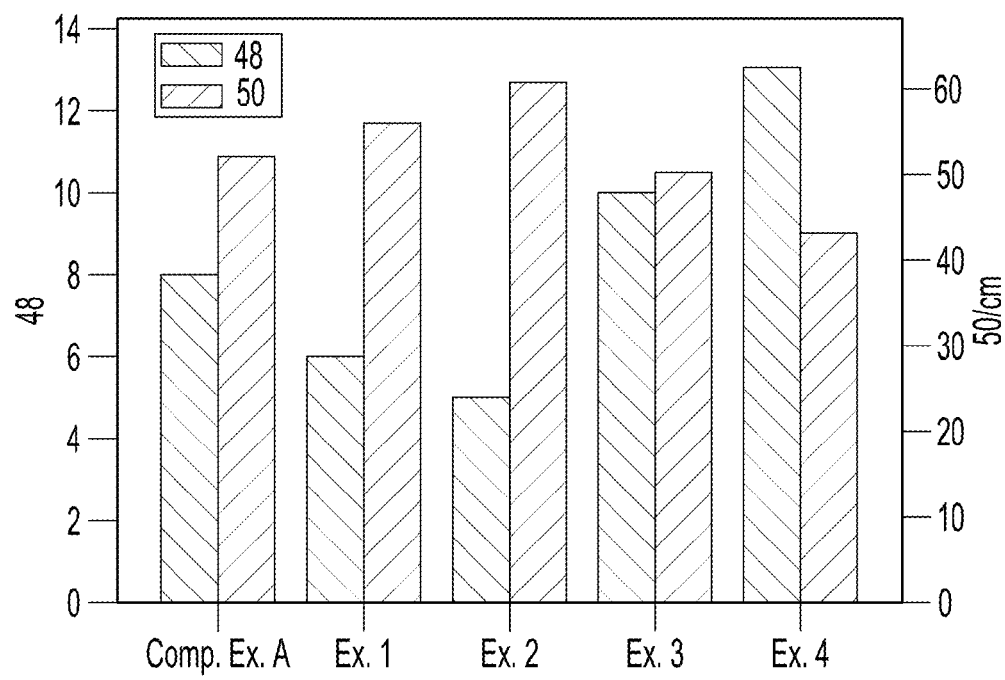
FIG. 5 is a graphical representation of a relationship between a hot tearing sensitivity value and a fluidity of the aluminum alloys of Comparative Example A and Examples 1-4.
Figure 16:
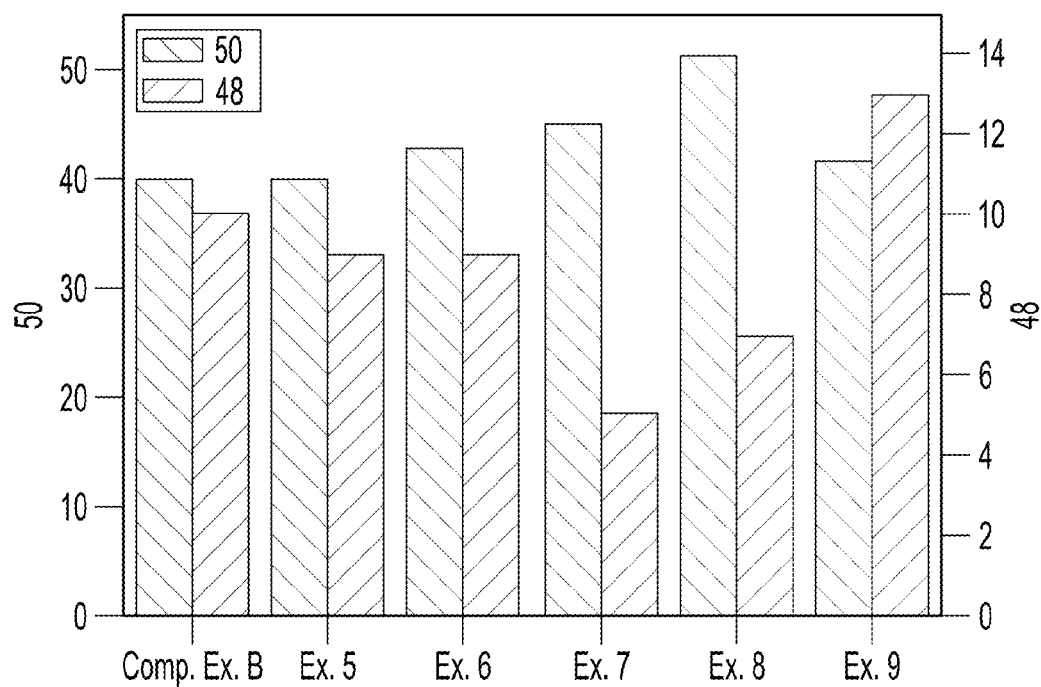
FIG. 16 is a graphical representation of a relationship between a hot tearing sensitivity value and a fluidity of the aluminum alloys of Comparative Example B and Examples 5-9.

Castability—Hot Tearing Sensitivity (HTS) 48 (FIGS. 5 and 16)

Each of the aluminum alloys of Comparative Examples A and B and Examples 5-9 is evaluated for hot tearing sensitivity 48 (FIGS. 5 and 16). In particular, for each hot tearing sensitivity evaluation, the respective aluminum alloy is poured into a hot tearing mold defining a sprue having a length of 20.32 cm and four cylindrical cavities therein, i.e., cavity A, cavity B, cavity C, and cavity D, and hardened to form four respective bars or castings, i.e., bar A, bar B, bar C, and bar D. Bar A has a length of 5.08 cm. Bar B has a length of 8.89 cm. Bar C has a length of 12.7 cm, and bar D has a length of 16.51 cm. Each of bars A-D has a diameter of 1.27 cm. Each of bars A-D is constrained at a first end by the sprue and at a second end by a spherical riser having a diameter of 1.905 cm. Each of bars A-D is separated from an adjacent bar by a distance of 3.81 cm as measured center of bar-to-center of bar.

For each of the aluminum alloys of Comparative Examples A and B and Examples 5-9, each of bars A-D is visually evaluated for cracking and assigned a hot tear sensitivity value, $C_i$, according to the following criteria and as summarized in Table 3:

Not Cracked=a bar that appears to be crack free
Hairline Crack=a hairline crack that extends over approximately half of a circumference of the bar
Light Crack=a hairline crack that extends over an entire circumference of the bar
Severe Crack=a crack that extends over an entire circumference of the bar
Complete Crack=a complete or almost complete separation of the bar

TABLE 3

Numerical Values Assigned to Crack Severity

| Category | Numerical Value ($C_i$) |
| --- | --- |
| Not Cracked | 0 |
| Hairline Crack | 1 |
| Light Crack | 2 |
| Severe Crack | 3 |
| Complete Crack | 4 |

Further, each of the bars A-D is assigned a numerical value, $L_i$, based on a length of the respective bar as summarized in Table 4.

TABLE 4

Numerical Values Assigned to Bar Length

| Bar | Length (cm) | Numerical Value ($L_i$) |
| --- | --- | --- |
| A | 5.08 | 4 |
| B | 8.89 | 3 |
| C | 12.70 | 2 |
| D | 16.51 | 1 |

A hot tearing sensitivity value 48 is calculated for each of the aluminum alloys of Comparative Example A and Examples 1-4 according to equation (1):

$$HTS = \sum_{i=A}^{D}(C_i \times L_i) \quad (1)$$

wherein $C_i$ and $L_i$ are listed in Tables 3 and 4. The hot tearing sensitivity values 48 for the aluminum alloys of Comparative Examples A and B and Examples 5-9 are summarized in Table 5 and FIGS. 5 and 16.

Castability—Fluidity 50 (FIGS. 5 and 16)

Each of the aluminum alloys of Comparative Examples A and B and Examples 1-9 is evaluated for fluidity 50 (FIGS. 5 and 16). As used herein, the terminology "fluidity 50" represents a distance that a molten aluminum alloy can flow within a cavity defined by a casting mold before the molten aluminum alloy solidifies, wherein the cavity has a constant cross-sectional area. Each of the aluminum alloys of Comparative Examples A and B and Examples 5-9 in a molten state is poured into a spiral-shaped cavity defined by a casting mold. A length that the molten aluminum alloy flows within the spiral-shaped cavity before solidifying is measured and summarized in Table 5.

TABLE 5

Comparison of Castability (Hot Tearing Sensitivity 48 and Fluidity 50) of Aluminum Alloys

| | Hot Tearing Sensitivity | | | | | |
| --- | --- | --- | --- | --- | --- | --- |
| Sample | $C_A \times L_A$ | $C_B \times L_B$ | $C_C \times L_C$ | $C_D \times L_D$ | HTS = $\sum_{i=A}^{D}(C_i \times L_i)$ | Fluidity (cm) |
| Comp. Ex. A | 0 x 4 | 2 x 3 | 1 x 2 | 0 x 1 | 8 | 52 |
| Ex. 1 | 0 x 4 | 0 x 3 | 2 x 2 | 2 x 1 | 6 | 56 |
| Ex. 2 | 0 x 4 | 1 x 3 | 1 x 2 | 0 x 1 | 5 | 60 |
| Ex. 3 | 0 x 4 | 2 x 3 | 1 x 2 | 2 x 1 | 10 | 50 |
| Ex. 4 | 0 x 4 | 2 x 3 | 2 x 2 | 3 x 1 | 13 | 43 |
| Comp. Ex. B | 0 x 4 | 1 x 3 | 2 x 2 | 3 x 1 | 10 | 40 |
| Ex. 5 | 0 x 4 | 1 x 3 | 1 x 2 | 4 x 1 | 9 | 40 |
| Ex. 6 | 0 x 4 | 1 x 3 | 2 x 2 | 2 x 1 | 9 | 42.8 |
| Ex. 7 | 0 x 4 | 0 x 3 | 2 x 2 | 1 x 1 | 5 | 45 |
| Ex. 8 | 0 x 4 | 1 x 3 | 2 x 2 | 0 x 1 | 7 | 51 |
| Ex. 9 | 0 x 4 | 3 x 3 | 0 x 2 | 4 x 1 | 13 | 41.5 |

Referring to FIG. 5, the aluminum alloy of Example 3, which includes lanthanum present in an amount of 0.3 parts by weight based on 100 parts by weight of the aluminum alloy, exhibits the lowest hot tearing sensitivity value 48 and highest fluidity 50 of the aluminum alloys of Comparative Example A and Examples 1-4. Further, referring to Examples 1 and 2, as the amount of lanthanum present in the aluminum alloy increases from 0.1 part by weight to 0.3 parts by weight, hot tearing sensitivity values 48 decrease and fluidity 50 increases. Conversely, referring to Examples 3 and 4, as the amount of lanthanum present in the aluminum alloy increases from 0.55 parts by weight to 0.67 parts by weight based on 100 parts by weight of the aluminum alloy, hot tearing sensitivity values 48 increase and fluidity 50 decreases. Therefore, aluminum alloys including lanthanum in an amount of from about 0.1 part by weight to about 0.3 parts by weight based on 100 parts by weight of the aluminum alloy exhibit excellent hot tearing sensitivity 48 and fluidity 50. More specifically, the aluminum alloy of Example 3 including lanthanum present in an amount of 0.3 parts by weight based on 100 parts by weight of the aluminum alloy increases the fluidity 50 of the molten aluminum alloy by 15.4% as compared to the aluminum alloy of Comparative Example A, and reduces the hot tearing sensitivity value 48 by 37.5% as compared to the aluminum alloy of Comparative Example A.

Referring to FIG. 16, the aluminum alloys of Examples 7 and 8, which include cerium present in an amount of 0.2 parts by weight and 0.3 parts by weight based on 100 parts by weight of the aluminum alloy, respectively, exhibit the lowest hot tearing sensitivity value 48 and highest fluidity 50 of the aluminum alloys of Comparative Example B and Examples 5-9. Further, referring to Examples 5 and 6, as the amount of cerium present in the aluminum alloy increases from 0.05 part by weight to 0.1 part by weight, hot tearing sensitivity values 48 are equivalent and fluidity 50 increases. Conversely, referring to Example 9, as the amount of cerium present in the aluminum alloy increases to 0.5 parts by weight based on 100 parts by weight of the aluminum alloy, hot tearing sensitivity values 48 increase and fluidity 50 decreases. Therefore, aluminum alloys including cerium in an amount of from about 0.2 parts by weight to about 0.3 parts by weight based on 100 parts by weight of the aluminum alloy exhibit excellent hot tearing sensitivity 48 and fluidity 50.

Figure 6:
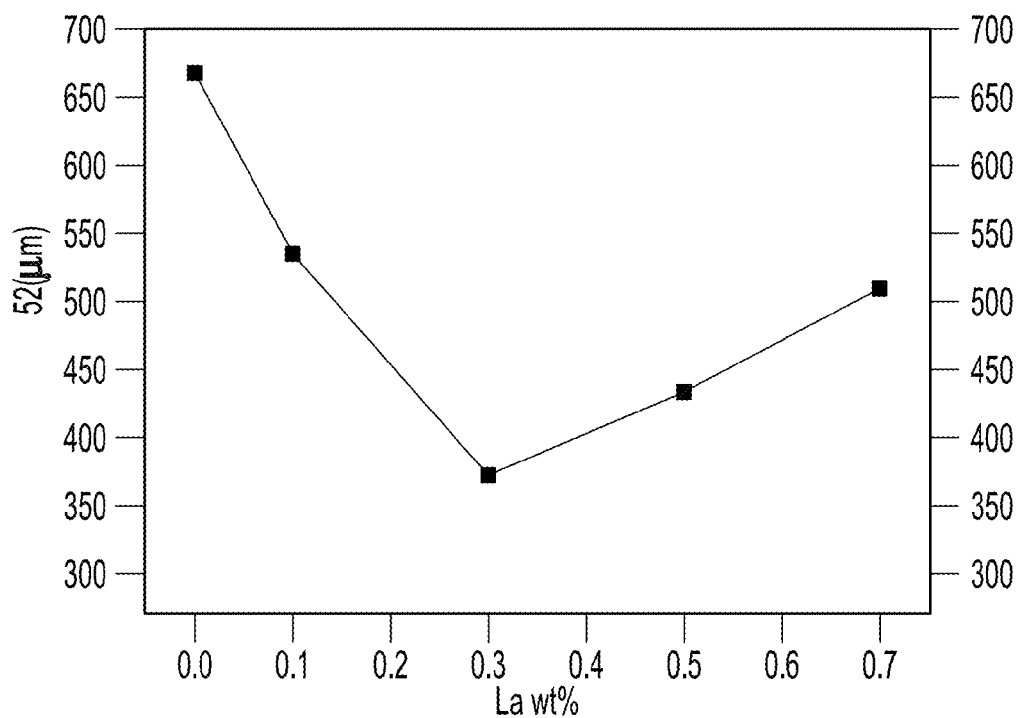
FIG. 6 is a graphical representation of a relationship between an amount of lanthanum present in the aluminum alloys of Comparative Example A and Examples 1-4, and a grain size of the aluminum alloys of Comparative Example A and Examples 1-4.
Figure 7:
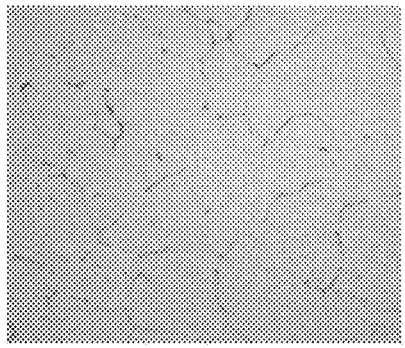
FIG. 7 is a metallographic micrograph of a constituent structure of the aluminum alloy of Comparative Example A.
Figure 8:
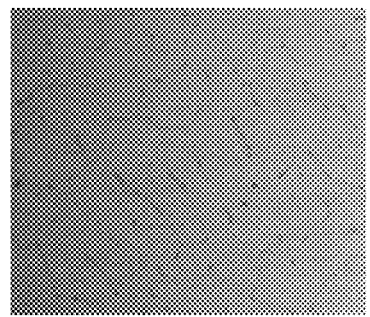
FIG. 8 is a metallographic micrograph of a constituent structure of the aluminum alloy of Example 1.

Microstructure—Grain Size 52 (FIG. 6)

The grain size 52 (FIG. 6) of each of the aluminum alloys of Comparative Example A and Examples 1-4 is measured with a scanning electron microscope.

Referring to FIG. 6, as an amount of lanthanum present in the aluminum alloy increases up to 0.3 parts by weight based on 100 parts by weight of the aluminum alloy, the grain size 52 of the aluminum alloy decreases. Conversely, as an amount of lanthanum present in the aluminum alloy increases to an amount of greater than 0.3 parts by weight based on 100 parts by weight of the aluminum alloy, the grain size 52 of the aluminum alloy increases.

Microstructure—Constituent Structure

The microstructure of the aluminum alloys of Comparative Examples A and B and Examples 1-9 are analyzed using a scanning electron microscope.

Figure 9:
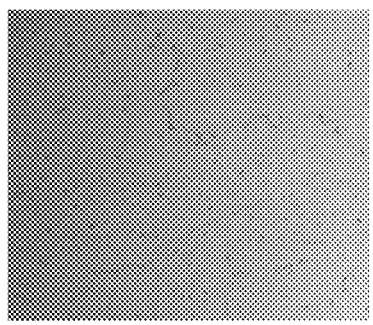
FIG. 9 is a metallographic micrograph of a constituent structure of the aluminum alloy of Example 2.
Figure 10:
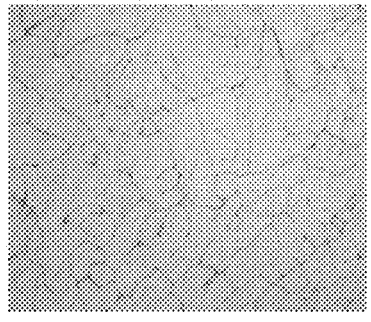
FIG. 10 is a metallographic micrograph of a constituent structure of the aluminum alloy of Example 3.
Figure 11:
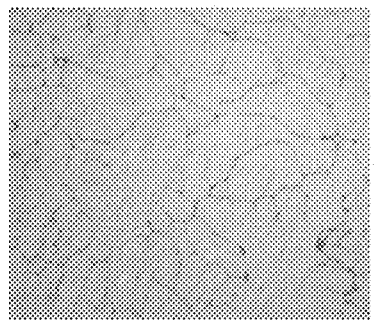
FIG. 11 is a metallographic micrograph of a constituent structure of the aluminum alloy of Example 4.

Referring to FIGS. 7-11, as an amount of lanthanum present in the aluminum alloy of Examples 1-4 increases, a number of constituent phases at each grain boundary increases, but morphology of the grain boundary also changes. More specifically, referring to FIG. 7 and the aluminum alloy of Comparative Example A, each constituent phase is partially connected to another constituent phase to form a network. However, referring to FIGS. 8 and 9 and the aluminum alloys of Examples 1 and 2, as the amount of lanthanum present in the aluminum alloy increases, each constituent phase is less-connected to another constituent phase to thereby decrease the presence of the network. As shown in FIG. 9, for the aluminum alloy of Example 2 including lanthanum present in an amount of 0.3 parts by weight based on 100 parts by weight of the aluminum alloy, the presence of the network is significantly decreased and a presence of fine spherical particles is increased. However, referring to FIGS. 10 and 11 and the aluminum alloys of Examples 3 and 4, aluminum alloys including lanthanum in an amount of greater than 0.3 parts by weight based on 100 parts by weight of the aluminum alloy exhibit formation of a continuous network of secondary phases at the grain boundaries and dendritic cell boundaries.

Figure 20:
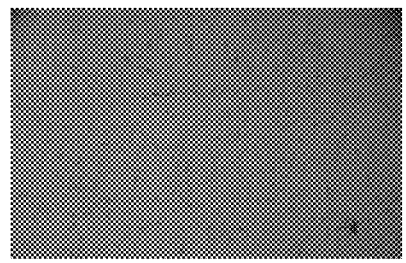
FIG. 20 is a metallographic micrograph of a constituent structure of the aluminum alloy of Example 7.
Figure 21:
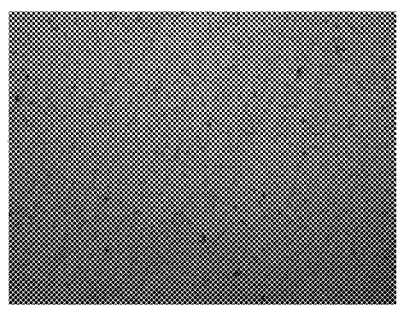
FIG. 21 is a metallographic micrograph of a constituent structure of the aluminum alloy of Example 8.
Figure 22:
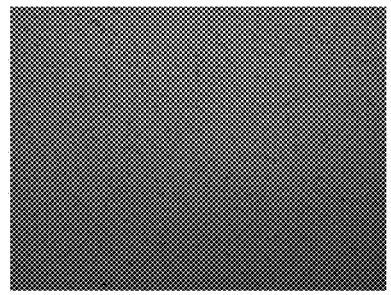
FIG. 22 is a metallographic micrograph of a constituent structure of the aluminum alloy of Example 9.

Similarly, referring to FIGS. 17-22, as an amount of cerium present in the aluminum alloy of Examples 5-9 increases, a number of constituent phases at each grain boundary increases, but morphology of the grain boundary also changes. More specifically, referring to FIG. 17 and the aluminum alloy of Comparative Example B, each constituent phase is partially connected to another constituent phase to form a network. However, referring to FIGS. 18 and 19 and the aluminum alloys of Examples 5 and 6, as the amount of cerium present in the aluminum alloy increases, each constituent phase is less-connected to another constituent phase to thereby decrease the presence of the network. As shown in FIGS. 20 and 21, for the aluminum alloys of Examples 7 and 8 including cerium present in an amount of 0.2 parts by weight and 0.3 parts by weight based on 100 parts by weight of the aluminum alloy, respectively, the presence of the network is significantly decreased and a presence of fine spherical particles is increased. However, referring to FIG. 22 and the aluminum alloy of Example 9, aluminum alloys including cerium in an amount of greater than 0.3 parts by weight based on 100 parts by weight of the aluminum alloy exhibit formation of a continuous network of secondary phases at the grain boundaries and dendritic cell boundaries.

Mechanical Properties

Castings formed from each the aluminum alloys of Comparative Examples A and Examples 1-4 are evaluated for ultimate tensile strength, $\sigma_b$, yield strength, $\sigma_{0.2}$, and ductility, $\epsilon$, as-cast and at a temper designation T7, i.e., solution heat treated and over-aged, in accordance with test methods ASTM B345, B577, and E8, respectively. Castings formed from each of the aluminum alloys of Comparative Example B and Examples 5-9 are evaluated for hardness (HBS, hardened steel ball as indenter) in accordance with test method ASTM E10. Ultimate tensile strength $\sigma_b$, yield strength $\sigma_{0.2}$, and ductility $\epsilon$ are summarized in FIGS. 12-14 and Table 6. Hardness is summarized in Table 6.

Figure 12:
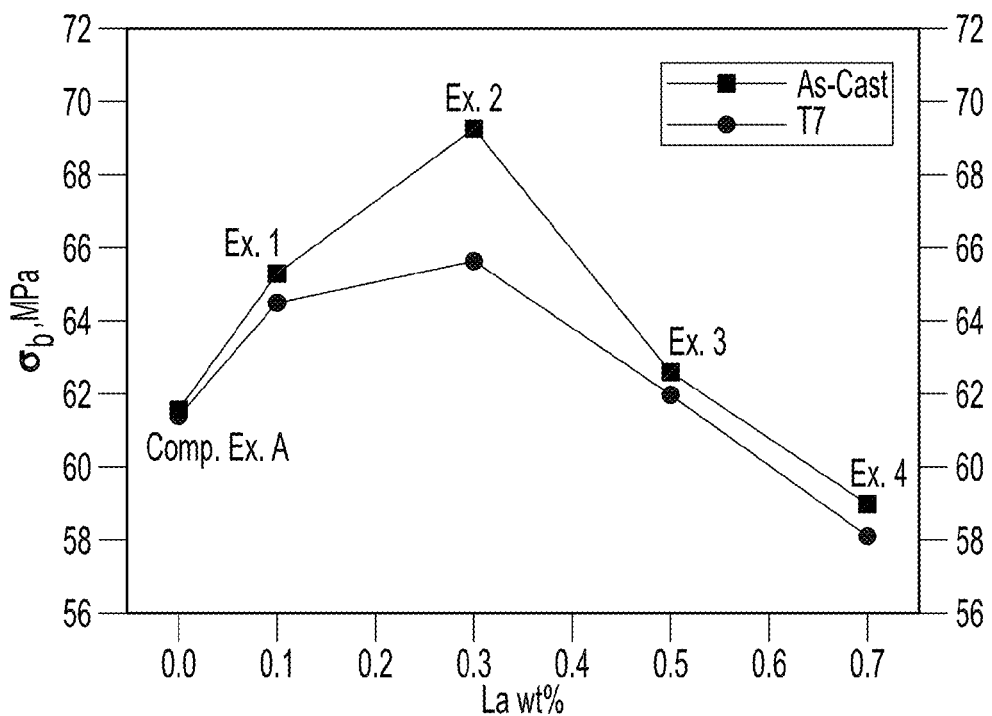
FIG. 12 is a graphical representation of a relationship between an amount of lanthanum present in the aluminum alloys of Comparative Example A and Examples 1-4, and an ultimate tensile strength of a casting formed therefrom.

Referring to FIG. 12, as an amount of lanthanum present in the aluminum alloy increases to 0.3 parts by weight based on 100 parts by weight of the aluminum alloy, ultimate tensile strength $\sigma_b$ of a casting increases. Conversely, as an amount of lanthanum present in the aluminum alloy increases to greater than 0.3 parts by weight based on 100 parts by weight of the aluminum alloy, ultimate tensile strength $\sigma_b$ of a casting decreases. A casting formed from the aluminum alloy of Example 2 exhibits a higher ultimate tensile strength $\sigma_b$ than any casting formed from the aluminum alloys of Comparative Example A and Examples 1, 3, and 4.

Figure 13:
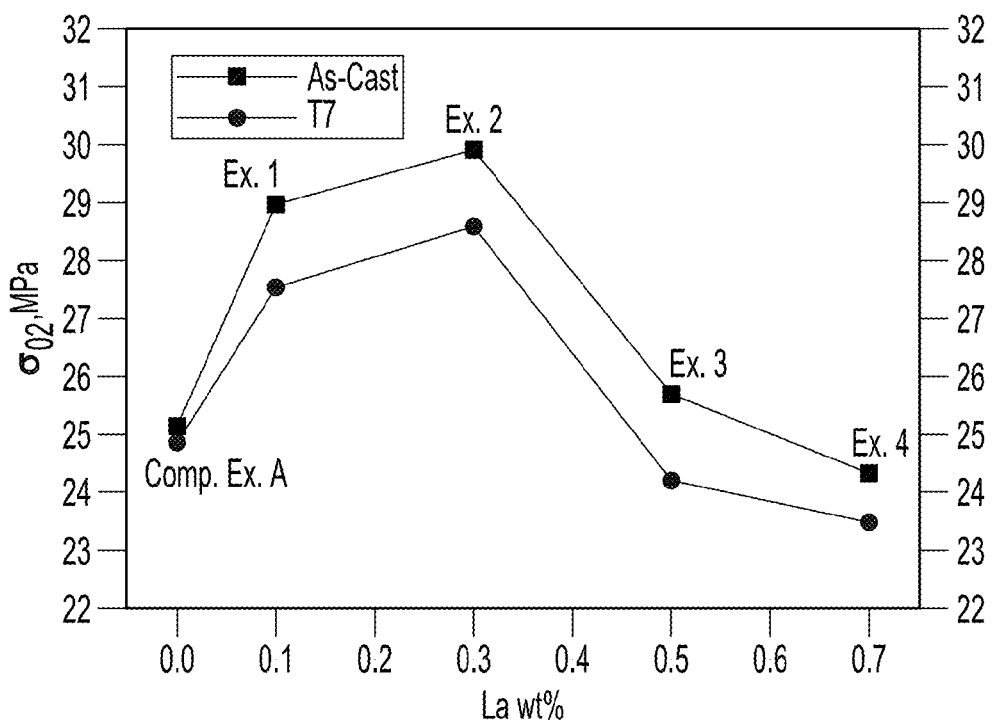
FIG. 13 is a graphical representation of a relationship between an amount of lanthanum present in the aluminum alloys of Comparative Example A and Examples 1-4, and a yield strength of a casting formed therefrom.

Referring to FIG. 13, as an amount of lanthanum present in the aluminum alloy increases to 0.3 parts by weight based on 100 parts by weight of the aluminum alloy, yield strength $\sigma_{0.2}$ of a casting increases. Conversely, as an amount of lanthanum present in the aluminum alloy increases to greater than 0.3 parts by weight based on 100 parts by weight of the aluminum alloy, yield strength $\sigma_{0.2}$ of a casting decreases. A casting formed from the aluminum alloy of Example 2 exhibits a higher yield strength $\sigma_{0.2}$ than any casting formed from the aluminum alloys of Comparative Example A and Examples 1, 3, and 4.

Figure 14:
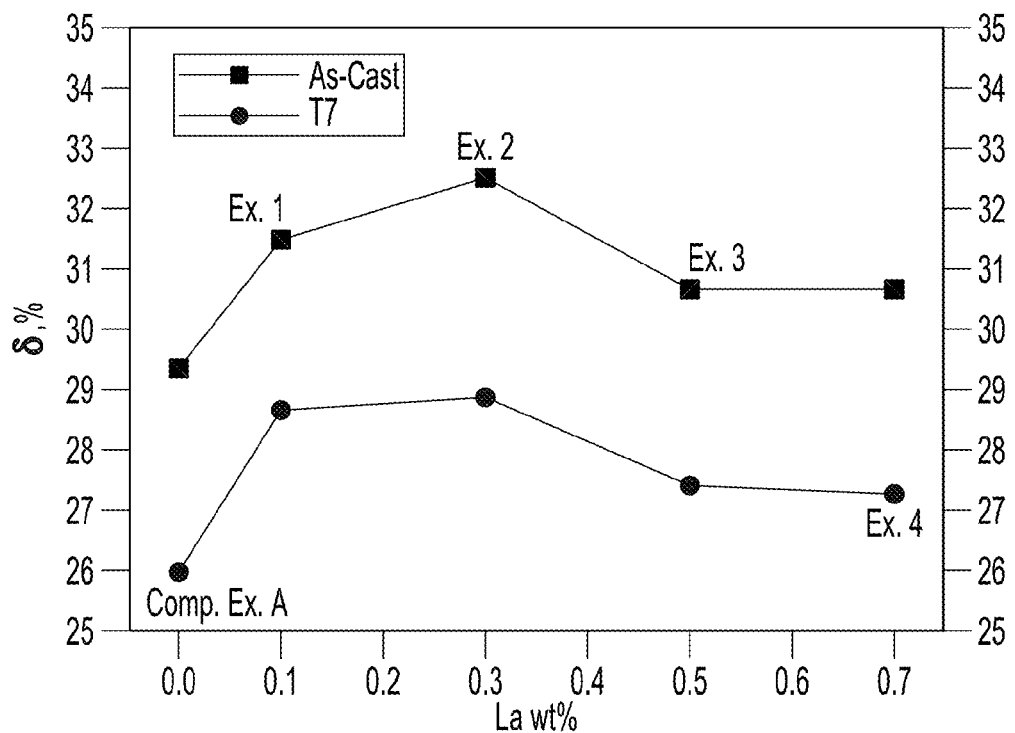
FIG. 14 is a graphical representation of a relationship between an amount of lanthanum present in the aluminum alloys of Comparative Example A and Examples 1-4, and a ductility of a casting formed therefrom.

Referring to FIG. 14, as an amount of lanthanum present in the aluminum alloy increases to 0.3 parts by weight based on 100 parts by weight of the aluminum alloy, ductility $\epsilon$ of a casting increases. Conversely, as an amount of lanthanum present in the aluminum alloy increases to greater than 0.3 parts by weight based on 100 parts by weight of the aluminum alloy, ductility $\epsilon$ of a casting decreases. A casting formed from the aluminum alloy of Example 2 exhibits a higher ductility $\epsilon$ than any casting formed from the aluminum alloys of Comparative Example A and Examples 1, 3, and 4.

TABLE 6

Mechanical Properties of Aluminum Alloys

| Sample | Temper | Hardness (HBS) | Ultimate Tensile Strength (MPa) | Yield Strength (MPa) | Ductility (%) |
|---|---|---|---|---|---|
| Comp. Ex. B | As-Cast | 24.82 | 62.69 | 27.12 | 30.24 |
|  | T7 | 25.88 | 62.71 | 27.4 | 34.78 |
| Ex. 5 | As-Cast | 25.10 | 60.19 | 27.04 | 34.57 |
|  | T7 | 26.18 | 60.56 | 28.22 | 27.41 |
| Ex. 6 | As-Cast | 25.14 | 60.95 | 26.56 | 35.36 |
|  | T7 | 26.42 | 62.23 | 28.92 | 31.69 |
| Ex. 7 | As-Cast | 28.08 | 62.78 | 26.20 | 36.24 |
|  | T7 | 29.30 | 63.54 | 29.14 | 37.59 |
| Ex. 8 | As-Cast | 27.76 | 65.04 | 26.75 | 38.10 |
|  | T7 | 29.46 | 67.36 | 29.01 | 42.24 |
| Ex. 9 | As-Cast | 25.80 | 64.17 | 27.37 | 33.85 |
|  | T7 | 27.10 | 67.68 | 29.00 | 34.80 |

Referring to Table 6, as an amount of cerium present in the aluminum alloy increases to 0.2 parts by weight and 0.3 parts by weight based on 100 parts by weight of the aluminum alloy, hardness of a casting increases. Conversely, as an amount of cerium present in the aluminum alloy increases to greater than 0.3 parts by weight based on 100 parts by weight of the aluminum alloy, hardness of a casting decreases. Castings formed from the aluminum alloys of Examples 7 and 8 exhibit a higher hardness than any casting formed from the aluminum alloys of Comparative Example B and Examples, 5, 6, and 9.

Referring again to Table 6, as an amount of cerium present in the aluminum alloy increases to 0.2 parts by weight and 0.3 parts by weight based on 100 parts by weight of the aluminum alloy, ultimate tensile strength $\sigma_b$ of a casting increases. Conversely, as an amount of cerium present in the aluminum alloy increases to greater than 0.3 parts by weight based on 100 parts by weight of the aluminum alloy, ultimate tensile strength $\sigma_b$ of a casting decreases. Castings formed from the aluminum alloys of Examples 7 and 8 exhibit a higher ultimate tensile strength $\sigma_b$ than any casting formed from the aluminum alloys of Comparative Example B and Examples 5, 6, and 9.

Referring again to Table 6, as an amount of cerium present in the aluminum alloy increases to 0.2 parts by weight and 0.3 parts by weight based on 100 parts by weight of the aluminum alloy, yield strength $\sigma_{0.2}$ of an as-cast casting generally decreases, and yield strength $\sigma_{0.2}$ of a T7 casting generally increases. Conversely, as an amount of cerium present in the aluminum alloy increases to greater than 0.3 parts by weight based on 100 parts by weight of the aluminum alloy, yield strength $\sigma_{0.2}$ of an as-cast casting increases, and yield strength $\sigma_{0.2}$ of a T7 casting decreases. T7 castings formed from the aluminum alloys of Examples 7 and 8 exhibit a higher yield strength $\sigma_{0.2}$ than any T7 casting formed from the aluminum alloys of Comparative Example B and Examples 5, 6, and 9.

With continued reference to Table 6, as an amount of cerium present in the aluminum alloy increases to 0.2 parts by weight and 0.3 parts by weight based on 100 parts by weight of the aluminum alloy, ductility $\epsilon$ of a casting increases. Conversely, as an amount of cerium present in the aluminum alloy increases to greater than 0.3 parts by weight based on 100 parts by weight of the aluminum alloy, ductility $\epsilon$ of a casting decreases. Castings formed from the aluminum alloys of Examples 7 and 8 exhibit a higher ductility $\epsilon$ than any casting formed from the aluminum alloys of Comparative Example B and Examples 5, 6, and 9.

Electrical Conductivity 54 (FIGS. 15 and 23)

An electrical conductivity 54 (FIGS. 15 and 23) of a casting formed from each of the aluminum alloys of Comparative Examples A and B and Examples 5-9 is evaluated as-cast and at a temper designation T7, i.e., solution heat treated and over-aged, in accordance with test method ASTM B236.

Referring to FIG. 15, as an amount of lanthanum present in the aluminum alloy increases to 0.55 parts by weight based on 100 parts by weight of the aluminum alloy, the electrical conductivity 54 of a casting increases. Conversely, as an amount of lanthanum present in the aluminum alloy increases to greater than 0.55 parts by weight based on 100 parts by weight of the aluminum alloy, electrical conductivity 54 of a casting decreases. A casting formed from the aluminum alloy of Example 3 exhibits a higher electrical conductivity 54 than any casting formed from the aluminum alloys of Comparative Example A and Examples 1, 2, and 4.

Referring to FIG. 23, as an amount of cerium present in the aluminum alloy increases to 0.2 parts by weight based on 100 parts by weight of the aluminum alloy, the electrical conductivity 54 of a casting increases. Conversely, as an amount of cerium present in the aluminum alloy increases to greater than 0.2 parts by weight based on 100 parts by weight of the aluminum alloy, electrical conductivity 54 of a casting decreases. A casting formed from the aluminum alloy of Example 7 exhibits a higher electrical conductivity 54 than any casting formed from the aluminum alloys of Comparative Example B and Examples 5, 6, 8, and 9.

While the best modes for carrying out the present invention have been described in detail, those familiar with the art to which this invention relates will recognize various alternative designs and embodiments for practicing the invention within the scope of the appended claims.

The invention claimed is:

1. A rotor for an electromagnetic device, the rotor comprising:
   a shorting ring defining a plurality of cavities therein;
   a plurality of conductor bars each integral with the shorting ring and having an end disposed within a respective one of the plurality of cavities;
   wherein the shorting ring and each of the plurality of conductor bars are formed from an aluminum alloy including:
      silicon present in an amount of less than or equal to about 0.15 parts by weight based on 100 parts by weight of the aluminum alloy;
      iron present in an amount of from about 0.109 parts by weight to about 0.129 parts by weight based on 100 parts by weight of the aluminum alloy;
      copper present in an amount of less than or equal to about 0.1 part by weight based on 100 parts by weight of the aluminum alloy;
      zinc present in an amount of less than or equal to about 0.05 parts by weight based on 100 parts by weight of the aluminum alloy;
      an additive of at least one element selected from the group consisting of manganese, magnesium, chromium, titanium, and vanadium, wherein the additive is present in an amount of less than or equal to about 0.04 parts by weight based on 100 parts by weight of the aluminum alloy;
      a lanthanoid present in an amount of from about 0.1 part by weight to about 0.5 parts by weight based on 100 parts by weight of the aluminum alloy; and
      the balance aluminum.

2. The rotor of claim 1, wherein the lanthanoid is lanthanum and is present in an amount of from about 0.1 part by weight to about 0.3 parts by weight based on 100 parts by weight of the aluminum alloy.

3. The rotor of claim 2, wherein lanthanum is present in an amount of about 0.3 parts by weight based on 100 parts by weight of the aluminum alloy.

4. The rotor of claim 2, wherein silicon is present in an amount of from about 0.075 parts by weight to about 0.107 parts by weight based on 100 parts by weight of the aluminum alloy.

5. The rotor of claim 2, wherein magnesium is present in an amount of from about 0.0003 parts by weight to about 0.0009 parts by weight based on 100 parts by weight of the aluminum alloy.

6. The rotor of claim 2, wherein titanium is present in an amount of from about 0.012 parts by weight to about 0.03 parts by weight based on 100 parts by weight of the aluminum alloy.

7. The rotor of claim 2, wherein vanadium is present in an amount of from about 0.0029 parts by weight to about 0.005 parts by weight based on 100 parts by weight of the aluminum alloy.

8. The rotor of claim 1, wherein the lanthanoid is cerium and is present in an amount of from about 0.2 parts by weight to about 0.3 parts by weight based on 100 parts by weight of the aluminum alloy.

9. The rotor of claim 8, wherein cerium is present in an amount of about 0.3 parts by weight based on 100 parts by weight of the aluminum alloy.

10. The rotor of claim 8, wherein silicon is present in an amount of from about 0.073 parts by weight to about 0.078 parts by weight based on 100 parts by weight of the aluminum alloy.

11. The rotor of claim 8, wherein magnesium is present in an amount of less than or equal to about 0.0001 part by weight based on 100 parts by weight of the aluminum alloy.

12. The rotor of claim 8, wherein iron is present in an amount of from about 0.110 parts by weight to about 0.115 parts by weight based on 100 parts by weight of the aluminum alloy.

13. The rotor of claim 8, wherein titanium is present in an amount of from about 0.01 part by weight to about 0.013 parts by weight based on 100 parts by weight of the aluminum alloy.

14. The rotor of claim 8, wherein vanadium is present in an amount of from about 0.014 parts by weight to about 0.015 parts by weight based on 100 parts by weight of the aluminum alloy.

15. The rotor of claim 1, wherein the aluminum alloy includes:
   silicon present in an amount of from about 0.073 parts by weight to about 0.107 parts by weight based on 100 parts by weight of the aluminum alloy;
   magnesium present in an amount of less than or equal to about 0.0009 parts by weight based on 100 parts by weight of the aluminum alloy;
   iron present in an amount of from about 0.110 parts by weight to about 0.129 parts by weight based on 100 parts by weight of the aluminum alloy;
   titanium present in an amount of from about 0.013 parts by weight to about 0.03 parts by weight based on 100 parts by weight of the aluminum alloy;
   vanadium present in an amount of from about 0.005 parts by weight to about 0.015 parts by weight based on 100 parts by weight of the aluminum alloy; and
   the lanthanoid present in an amount of about 0.3 parts by weight based on 100 parts by weight of the aluminum alloy.

16. A method of forming a rotor, the method comprising:
   melting a first aluminum alloy at a temperature of from about 700° C. to about 750° C. to form a liquid melt, wherein the first aluminum alloy includes:
      silicon present in an amount of less than or equal to about 0.15 parts by weight based on 100 parts by weight of the first aluminum alloy;
      iron present in an amount of from about 0.109 parts by weight to about 0.129 parts by weight based on 100 parts by weight of the first aluminum alloy;
      copper present in an amount of less than or equal to about 0.1 part by weight based on 100 parts by weight of the first aluminum alloy;
      zinc present in an amount of less than or equal to about 0.05 parts by weight based on 100 parts by weight of the first aluminum alloy;
      an additive of at least one element selected from the group consisting of manganese, magnesium, chromium, titanium, and vanadium, wherein the additive is present in an amount of less than or equal to about 0.025 parts by weight based on 100 parts by weight of the first aluminum alloy; and
      the balance aluminum;
   combining a master aluminum alloy including a lanthanoid present in an amount of about 10 parts by weight based on 100 parts by weight of the master aluminum alloy and the liquid melt to form an aluminum alloy;
   wherein the aluminum alloy includes:
      silicon present in an amount of less than or equal to about 0.15 parts by weight based on 100 parts by weight of the aluminum alloy;
      iron present in an amount of from about 0.109 parts by weight to about 0.129 parts by weight based on 100 parts by weight of the aluminum alloy;
      copper present in an amount of less than or equal to about 0.1 part by weight based on 100 parts by weight of the aluminum alloy;
      zinc present in an amount of less than or equal to about 0.05 parts by weight based on 100 parts by weight of the aluminum alloy;
      an additive of at least one element selected from the group consisting of manganese, magnesium, chromium, titanium, and vanadium, wherein the additive is present in an amount of less than or equal to about 0.04 parts by weight based on 100 parts by weight of the aluminum alloy;
      a lanthanoid present in an amount of from about 0.1 part by weight to about 0.5 parts by weight based on 100 parts by weight of the aluminum alloy; and
      the balance aluminum;
   filling a conductor bar cavity defined by a casting mold with the aluminum alloy;
   filling a shorting ring cavity fluidly connected to the conductor bar cavity and defined by the casting mold with the aluminum alloy;
   cooling the aluminum alloy disposed within the conductor bar cavity to form an end of a conductor bar; and
   concurrent with cooling the aluminum alloy disposed within the conductor bar cavity, cooling the aluminum alloy disposed within the shorting ring cavity to form a shorting ring integral with the end of the conductor bar and thereby form the rotor.

* * * * *